United States Patent
Matsuda

(10) Patent No.: US 8,326,952 B2
(45) Date of Patent: Dec. 4, 2012

(54) PARAMETER SETTING SYSTEM, DEVICE AND PARAMETER SETTING PROGRAM

(75) Inventor: Makoto Matsuda, Aisai (JP)

(73) Assignee: Brother Kogyo Kabushiki Kaisha, Nagoya, Shi, Aichi-Ken ( * ) Notice: Subject to any disclaimer, the term of this patent is extended or adjusted under 35 U.S.C. 154(b) by 1365 days.

(21) Appl. No.: 11/239,221

(22) Filed: Sep. 30, 2005

(65) Prior Publication Data

US 2006/0067336 A1    Mar. 30, 2006

(30) Foreign Application Priority Data

Sep. 30, 2004   (JP) ................. 2004-289131

(51) Int. Cl.
G06F 15/177    (2006.01)
(52) U.S. Cl. ........................................... 709/220
(58) Field of Classification Search .................. 709/220, 709/221, 222
See application file for complete search history.

(56) References Cited

U.S. PATENT DOCUMENTS

| | | | | |
|---|---|---|---|---|
| 5,485,590 | A * | 1/1996 | Hyatt et al. ................... | 711/115 |
| 5,857,073 | A | 1/1999 | Tsukamoto et al. | |
| 6,038,233 | A * | 3/2000 | Hamamoto et al. ........... | 370/401 |
| 6,040,834 | A * | 3/2000 | Jain et al. ...................... | 715/853 |
| 6,172,986 | B1 * | 1/2001 | Watanuki et al. .............. | 370/466 |
| 6,225,999 | B1 * | 5/2001 | Jain et al. ...................... | 715/734 |
| 6,559,964 | B1 | 5/2003 | Tsukamoto et al. | |
| 6,724,775 | B2 * | 4/2004 | Watanuki et al. .............. | 370/466 |
| 6,907,033 | B2 * | 6/2005 | Faccin ............................ | 370/352 |
| 7,031,288 | B2 * | 4/2006 | Ogier ............................. | 370/338 |
| 7,054,924 | B1 * | 5/2006 | Harvey et al. ................. | 709/220 |
| 7,069,312 | B2 * | 6/2006 | Kostic et al. .................. | 709/220 |
| 7,088,726 | B1 * | 8/2006 | Hamamoto et al. ........... | 370/401 |
| 7,152,099 | B1 * | 12/2006 | Arens ............................ | 709/220 |
| 7,248,591 | B2 * | 7/2007 | Hamamoto et al. ........... | 370/401 |
| 7,251,247 | B2 * | 7/2007 | Hamamoto et al. ........... | 370/401 |
| 7,272,407 | B2 * | 9/2007 | Strittmatter et al. ........... | 455/500 |
| 7,283,540 | B2 * | 10/2007 | Hamamoto et al. ........... | 370/401 |
| 7,539,777 | B1 * | 5/2009 | Aitken .......................... | 709/248 |

(Continued)

FOREIGN PATENT DOCUMENTS

JP    6195280 A    7/1994

(Continued)

OTHER PUBLICATIONS

Notification for Reason for Rejection in Japanese Application No. 2004-289131.

*Primary Examiner* — Alicia Baturay
(74) *Attorney, Agent, or Firm* — Banner & Witcoff, Ltd.

(57) ABSTRACT

A parameter setting system includes a setting device and setting target devices. The setting device includes a protocol inquiry mechanism that inquires the setting target device about a communication protocol acceptable to the setting target device; and a setting command mechanism that commands the setting target device to set the function parameter necessary to perform a communication function according to a communication protocol notified in response to an inquiry by the protocol inquiry mechanism. The setting target device includes a protocol response mechanism that notifies the protocol inquiry mechanism of information with respect to a protocol acceptable to the setting target device in response to the inquiry received from the protocol inquiry mechanism; and a commanded setting execution mechanism that sets the function parameter commanded to be set by the setting command mechanism.

12 Claims, 14 Drawing Sheets

U.S. PATENT DOCUMENTS

| | | | |
|---|---|---|---|
| 7,685,288 B2 * | 3/2010 | Kakivaya et al. | 709/227 |
| 7,701,958 B2 * | 4/2010 | Abrol et al. | 370/433 |
| 7,788,355 B2 * | 8/2010 | Maeda | 715/853 |
| 7,929,533 B2 * | 4/2011 | King et al. | 370/392 |
| 2003/0110464 A1 * | 6/2003 | Davidson et al. | 716/17 |
| 2003/0177220 A1 | 9/2003 | Ohara | |
| 2004/0004940 A1 * | 1/2004 | Abrol et al. | 370/252 |
| 2004/0013130 A1 * | 1/2004 | Blanchet et al. | 370/466 |
| 2004/0176117 A1 * | 9/2004 | Strittmatter et al. | 455/500 |
| 2004/0203797 A1 * | 10/2004 | Burr | 455/445 |
| 2004/0225762 A1 * | 11/2004 | Poo | 710/36 |
| 2005/0015507 A1 * | 1/2005 | Chin | 709/230 |
| 2005/0138166 A1 * | 6/2005 | Blanchet | 709/224 |
| 2005/0235051 A1 * | 10/2005 | Brown et al. | 709/220 |

FOREIGN PATENT DOCUMENTS

| | | |
|---|---|---|
| JP | 9149076 | 6/1997 |
| JP | 2001256154 A | 9/2001 |
| JP | 2001292191 A | 10/2001 |
| JP | 2002366315 A | 12/2002 |
| JP | 2003273873 | 9/2003 |

* cited by examiner

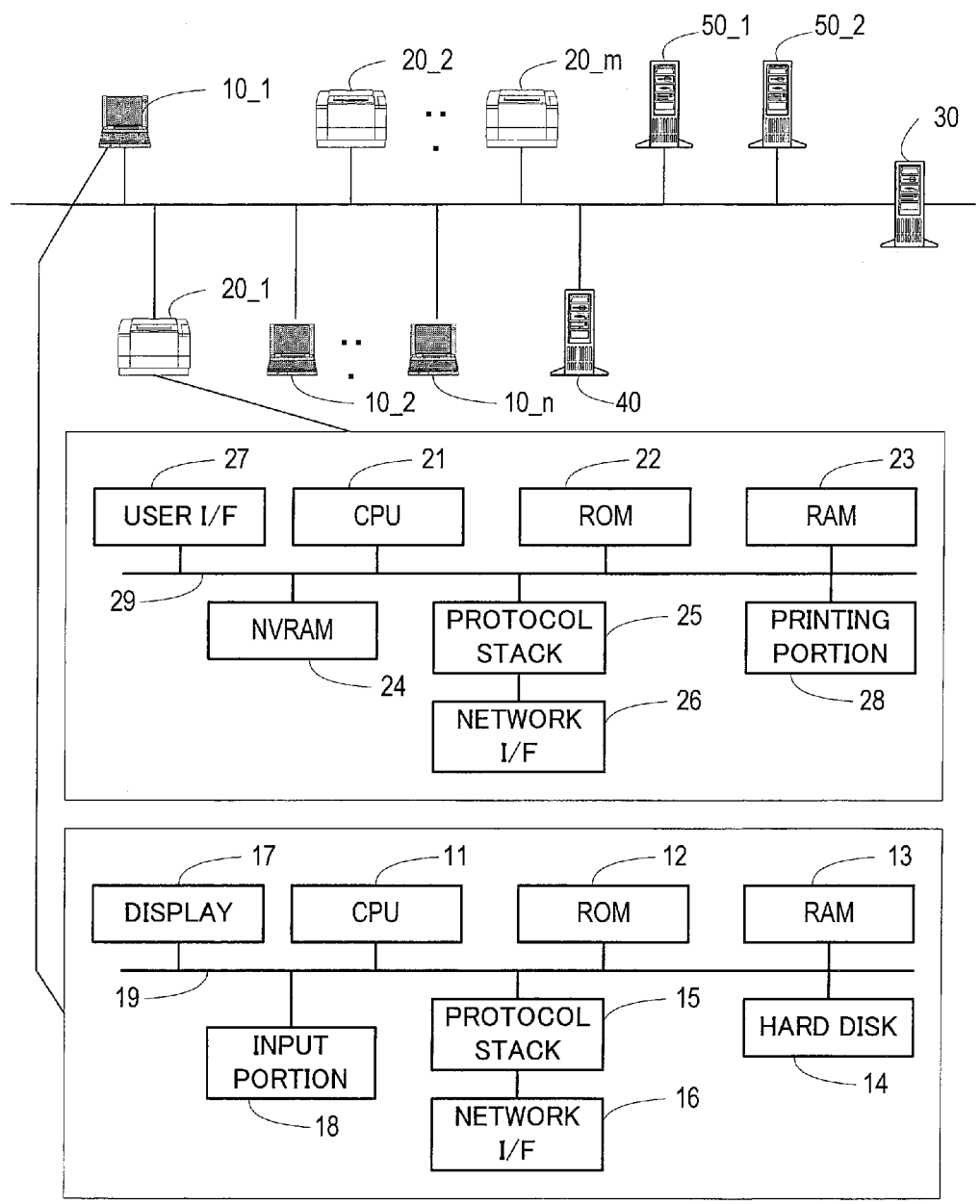

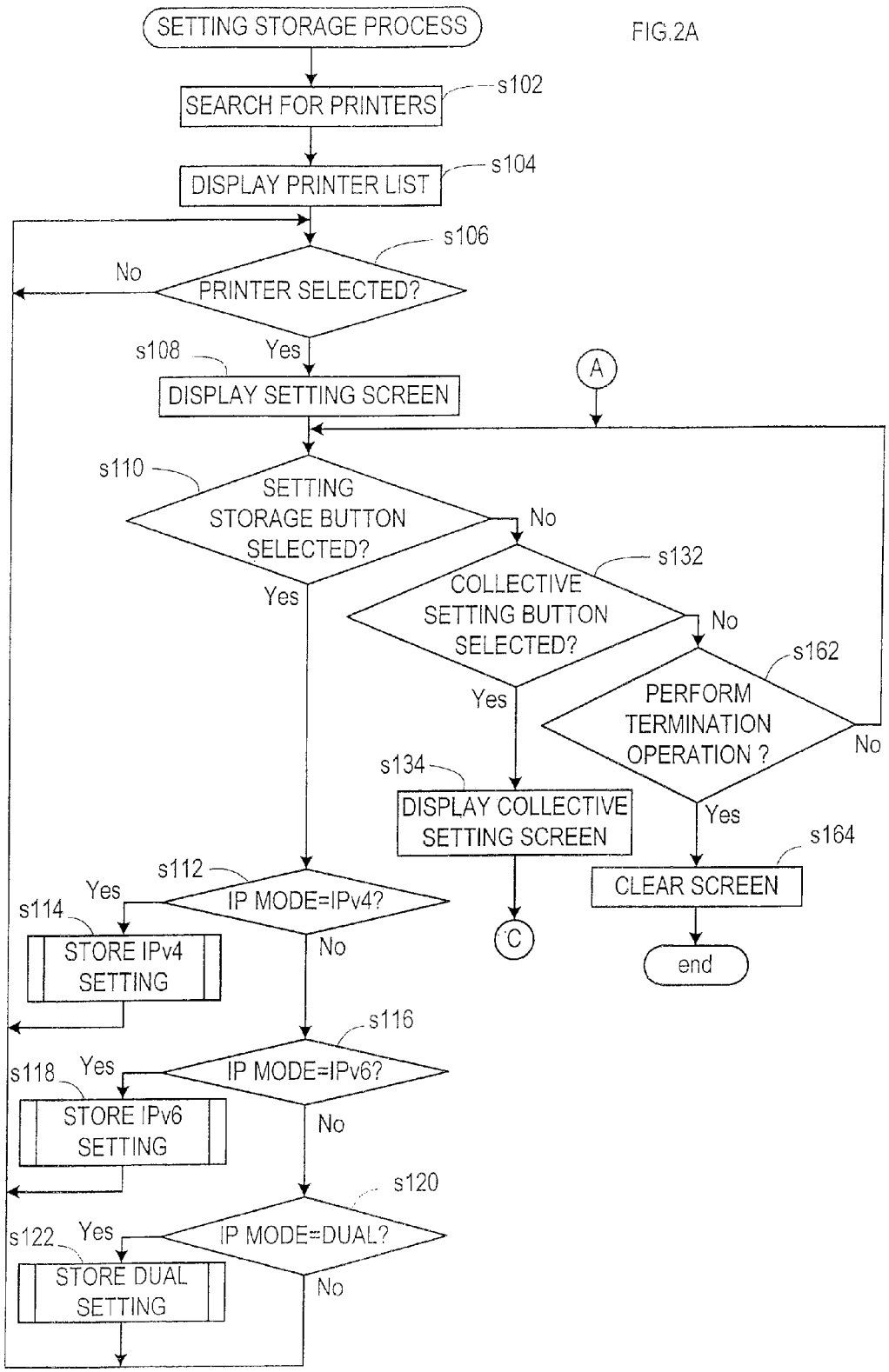

FIG.6A

| IPv4 SETTING STORAGE ITEM | SET VALUE | IP ADDRESS ITEM | SETTING TARGET IP MODE |
|---|---|---|---|
| IP VERSION | IPv4 | | |
| POP3 | 10.20.30.51 | Yes | IPv4 |
| SMTP | 10.20.30.50 | Yes | IPv4 |
| DNS Server Method | static | No | Dual |
| Primary DNS | 10.20.30.42 | Yes | IPv4 |
| Secondary DNS | 0.0.0.0 | Yes | IPv4 |
| Gateway timeout | 5 SECONDS | No | Dual |
| Timeout | 60 MINUTES | No | Dual |
| Boot Tries | 3 | No | Dual |

FIG.6B

| IPv6 SETTING STORAGE ITEM | SET VALUE | IP ADDRESS ITEM | SETTING TARGET IP MODE |
|---|---|---|---|
| IP VERSION | IPv6 | | |
| POP3 | 3ffe:0200:0000:010a:0000:0000:0000:0001 | Yes | IPv6 |
| SMTP | 3ffe:0200:0000:010a:0000:0000:0000:0002 | Yes | IPv6 |
| DNS Server Method | static | No | Dual |
| Primary DNS | 3ffe:0200:0000:010a:0000:0000:0000:0003 | Yes | IPv6 |
| Secondary DNS | 3ffe:0200:0000:010a:0000:0000:0000:0004 | Yes | IPv6 |
| Gateway timeout | 5 SECONDS | No | Dual |
| Timeout | 60 MINUTES | No | Dual |
| Boot Tries | 3 | No | Dual |
| Default router | 3ffe:0200:0000:010a:0000:0000:0000:0005 | Yes | IPv6 |
| Prefix length | 64 | No | IPv6 |
| Ignore rooterAdvertise | disable | No | IPv6 |
| Disable DHCPv6 | disable | No | IPv6 |
| ignore stateless address | disable | No | IPv6 |

FIG.6C

| Dual SETTING STORAGE ITEM | SET VALUE | IP ADDRESS ITEM | SETTING TARGET IP MODE |
|---|---|---|---|
| IP VERSION | Dual | | |
| POP3 | 12.34.45.56 | Yes | IPv4 |
| SMTP | 12.34.45.57 | Yes | IPv4 |
| DNS Server Method | static | No | Dual |
| Primary DNS | 3ffe:0200:0000:010a:0000:0000:0000:0003 | Yes | IPv6 |
| Secondary DNS | 12.34.45.58 | Yes | IPv4 |
| Gateway timeout | 5 SECONDS | No | Dual |
| Timeout | 60 MINUTES | No | Dual |
| Boot Tries | 3 | No | Dual |
| Default router | 3ffe:0200:0000:010a:0000:0000:0000:0005 | Yes | IPv6 |
| Prefix length | 64 | No | IPv6 |
| Ignore rooterAdvertise | disable | No | IPv6 |
| Disable DHCPv6 | disable | No | IPv6 |
| ignore stateless address | disable | No | IPv6 |

PARAMETER SETTING SYSTEM, DEVICE AND PARAMETER SETTING PROGRAM

CROSS-REFERENCE TO RELATED APPLICATIONS

This application claims the benefit of Japanese Patent application No. 2004-289131 filed Sep. 30, 2004 in the Japanese Patent Office, the disclosure of which is incorporated herein by reference.

BACKGROUND

The present invention relates to a parameter setting system configured such that it is possible to set a function parameter, which is necessary to perform a communication function available through a network, in a target device of parameter setting (hereinafter referred to as the "setting target device") by a setting device.

These days, devices which are configured such that communications can be performed selectively according to a plurality of types of communication protocols are commonly used, in addition to devices configured such that communications can be performed according to only a single communication protocol. A specific example of the former devices is a so-called dual-stack device in which communications according to IPv6 (Internet Protocol Version 6) can be performed in addition to communications according to IPv4 (Internet Protocol Version 4) that has been a widely used protocol. In view of the fact that IPv6 is a successor communication protocol to IPv4, devices which accept only IPv6 will be in the mainstream in the near future.

In the present situation as above, it may happen that devices which accept only a single communication protocol and devices which accept a plurality of types of communication protocols coexist to form a network. The devices which accept a plurality of types of communication protocols are usually designed such that it is possible to set a function parameter to enable use of functions available through the network according to either of the above mentioned communication protocols In this case, to facilitate setting of a function parameter even when a device is not provided with a sufficient user interface, unlike a personal computer, a program for performing indirect setting (i.e., remote set-up) of a function parameter from another device capable of data communications is used, as disclosed, for example, in Publication of Unexamined Japanese Patent Application No. 2003-273873.

SUMMARY

The above-mentioned setting using a program is performed by the procedure that a function parameter is transmitted from a device that executes the program, and a setting target device which has received the function parameter stores the function parameter in a predetermined storage area.

Accordingly, the setting of a function parameter must be performed according to a communication protocol acceptable to the setting target device. Otherwise, an unnecessary function parameter may be set, and thereby functions available through the network may not be appropriately used in some cases.

Nowadays, there is a printer to be connected to a network that has a function of receiving electronic mail including printing data through the network and of printing the printing data extracted from the electronic mail. In this case, it is required to set identification information of a mail server (i.e., an IP address) and a mail address of the printer as function parameters necessary to use, for example, a function of receiving electronic mail.

Formats of the function parameters to be set vary depending on which communication protocol among a plurality of communication protocols the function of receiving electronic mail can be achieved by, or more specifically, depending on which of IPv4 and IPv6 is acceptable to the mail server. If function parameters are set in a format according to an unacceptable communication protocol, the above-mentioned functions will not be available.

Therefore, setting of appropriate function parameters in a setting target device should be performed in a format according to a communication protocol which is acceptable to the setting target device.

The present invention, which has been made to solve the above described problem, has an object to provide a technology for preventing unnecessary function parameters from being set.

In one aspect of the present invention, there is provided a parameter setting system which comprises a plurality of devices connected to a network. The parameter setting system is configured such that a function parameter, which is necessary to perform a communication function available through the network, is capable of being set by a setting device among the plurality of devices in a setting target device among the plurality of devices except the setting device.

The setting device includes: a protocol inquiry mechanism that inquires the setting target device about a communication protocol acceptable to the setting target device; and a setting command mechanism that commands the setting target device to set the function parameter necessary to perform a communication function according to a communication protocol notified in response to an inquiry by the protocol inquiry mechanism.

The setting target device includes: a protocol response mechanism that notifies the protocol inquiry mechanism of information with respect to the communication protocol acceptable to the setting target device in response to the inquiry received from the protocol inquiry mechanism; and a commanded setting execution mechanism that sets the function parameter commanded to be set by the setting command mechanism.

BRIEF DESCRIPTION OF THE DRAWINGS

Preferred embodiments of the present invention will be described hereinafter with reference to the drawings, in which:

FIG. 1 is a diagrammatic view showing a network structure and control systems of devices;

FIGS. 2A and 2B are flowcharts showing a procedure of a setting storage process according to a first embodiment;

FIGS. 6A through 6C are explanatory views showing data structures in data tables;

DETAILED DESCRIPTION OF THE PREFERRED EMBODIMENTS

Figure 2B:
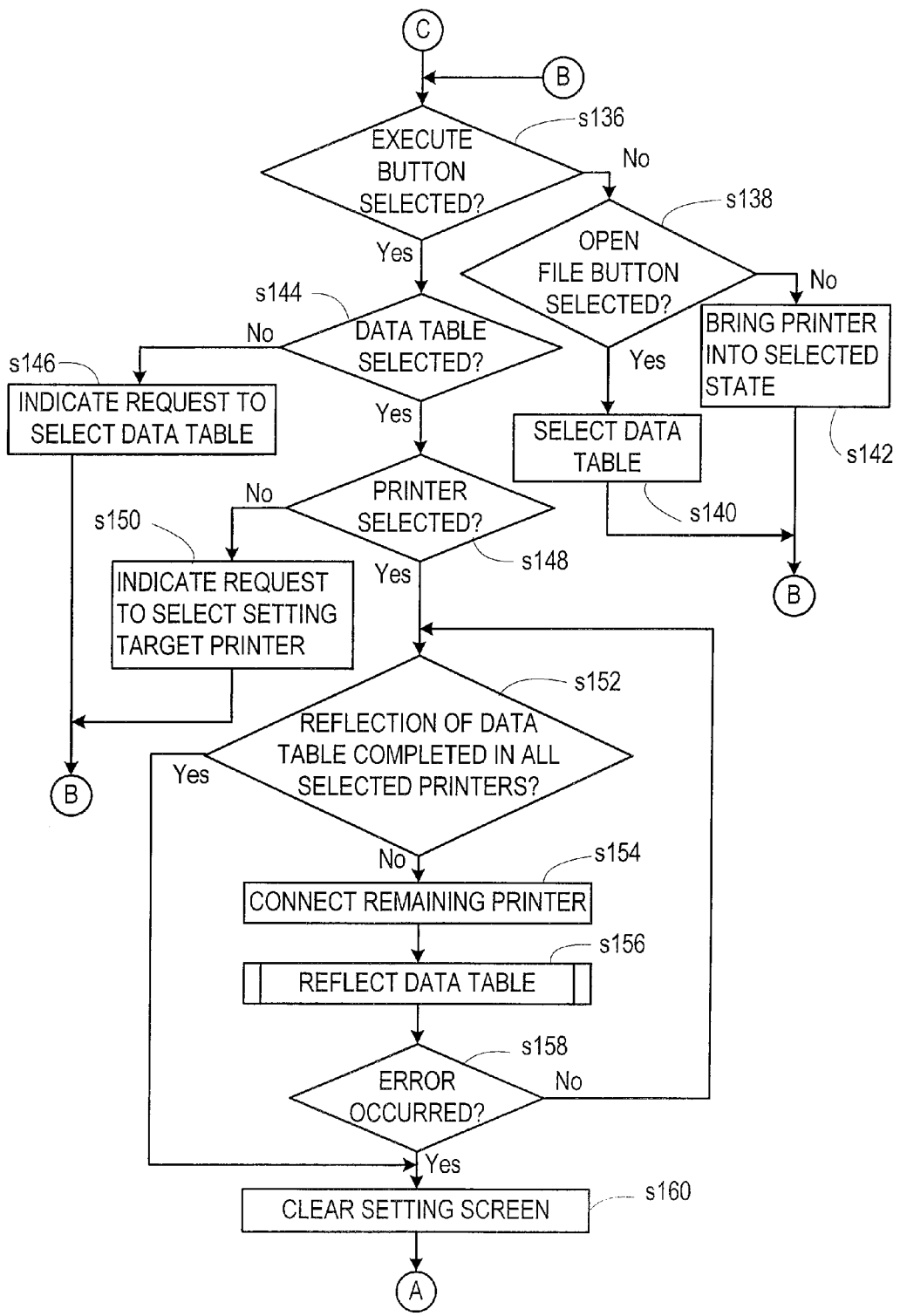

A parameter setting system will be described hereinafter with reference to FIG. 1. A plurality of personal computers (hereinafter referred to as the "PC"s) 10 (10_1 through 10_n), a plurality of printers 20 (20_1 through 20_m), a gateway 30, a mail server 40, a primary DNS (Domain Name System) server 50_1, a secondary DNS server 50_2 are interconnected so as to be capable of data communications through a network.

Each of the PCs 10 is a known computer system, including a CPU 11, a ROM 12, a RAM 13, a hard disk 14, a protocol stack 15, a network interface (a network I/F) 16, a display 17 and an input portion 18 interconnected through a bus 19. Each of the PCs 10 serves as a network device when connected to a network through the network I/F 16.

The protocol stack 15 is indicated as a component that connects the network I/F 16 to the bus 19 in FIG. 1. This is to indicate only on a conceptual basis that data communications by the network I/F 16 is performed by a process according to the protocol stack 15. The protocol stack 15 is actually a program module installed, i.e., stored in the hard disk 14, in order to perform data communications according to either of IPv4 and IPv6.

A parameter setting program for executing after-mentioned various processes is installed in the PC 10_1 among the PCs 10.

Each of the printers 20 is a known network printer, including a CPU 21, a ROM 22, a RAM 23, an NVRAM (Non Volatile RAM) 24, a protocol stack 25, a network interface (a network I/F) 26, a user interface (a user I/F) 27 and a printing portion 28 interconnected through a bus 29. Each of the printers 20 serves as a network device when connected to a network through the network I/F 26.

The protocol stack 25 is a program module stored in the NVRAM 24 in the same manner as the protocol stack 15 in each of the PCs 10.

A selective parameter setting program for executing after-mentioned various processes is installed in each of the printers 20. Each of the printers 20 has a function of notifying an error or the like to a predetermined address via electronic mail and a function of receiving electronic mail with attached printing data through the network and printing the printing data attached to the electronic mail (a network printing function).

The mail server 40 has functions as an SMTP server and a POP server, respectively.

Explanations of embodiments, in which different processes are to be executed by the respective PCs 10 on the above-described network, will now be provided hereinafter.

[Embodiment 1]

(i) Setting Storage Process

A procedure of a setting storage process executed by the PC 10_1, or the CPU 11 in the PC 10_1, will be described hereinafter with reference to FIGS. 2A and 2B. This is a manual setting process which is executed according to the above-mentioned parameter setting program.

First, the printers 20 on the network are searched for at the beginning of the execution of the parameter setting program (s102). Specifically, request data for requesting general information is transmitted to the printers 20 on the network. "General information" here means information assigned to the printers 20, such as device names (node names). The printers 20 which transmit general information in response to the request data arc to be detected.

Figure 3:
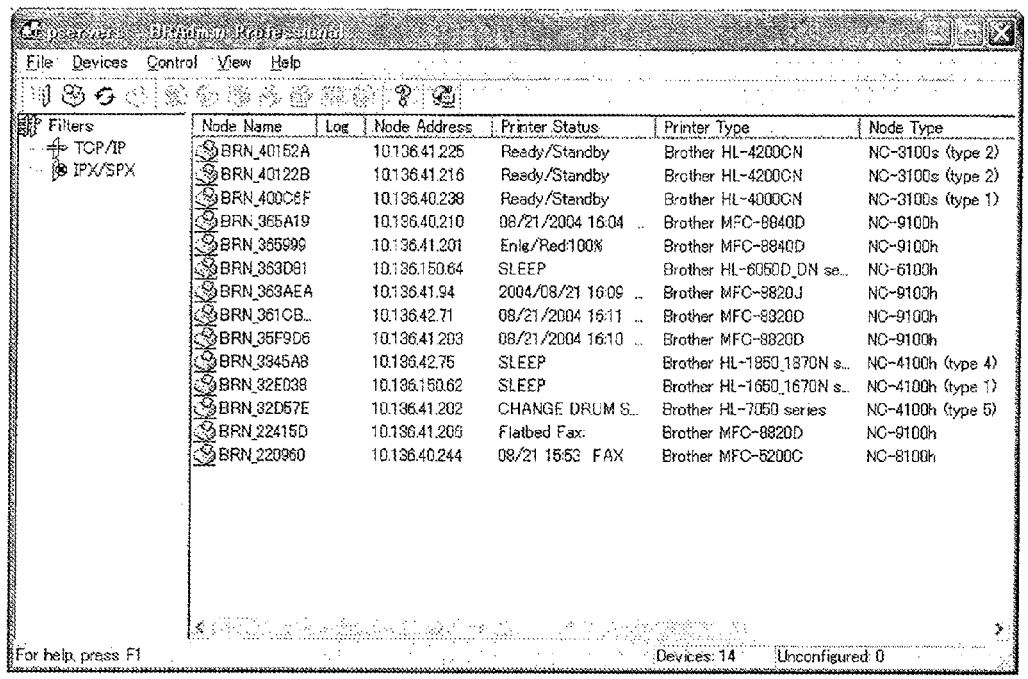
FIG. 3 is an explanatory view showing a list screen.

Subsequently, a list screen showing the information of the respective printers 20 detected in s102 in the form of a table is displayed on the display 17 (s104). Specifically, as shown in FIG. 3, the list screen is in the form of a table in which obtained information of the respective printers 20 is arranged corresponding to the device names (i.e., "Node Names"). When the list screen is displayed, a user may perform an operation of specifying one of the printers 20 (hereinafter referred to as the "base printer") on the list through the input portion 18. The general information shown in FIG. 3 is regularly obtained and the list is updated accordingly.

Once the list screen is displayed, the present process goes into a standby state until an operation of specifying the base printer is performed by the user (s106: NO).

When the user performs an operation of specifying the base printer, such as double clicking an intended printer (s106: YES), a setting screen for setting parameters in another printer based on the setting of the base printer (remote setup) is displayed on the display 17 (s108). Then, request data for requesting detailed setting information is transmitted to a specified printer 20. The "detailed setting information" includes, for example, an IF mode, an IP address of the mail server 40 (the POP server and the SMTP server), an IP address of the DNS server, and a time-out period indicating a waiting time in case of no communication response received. The IP mode indicates that the printer 20 is set to be capable of data communications according to one of or both of IPv4 and IPv6. An IP address item (a flag set to "1" when a parameter to be set is an IP address) is associated with each detailed information so as to indicate that the information specifies an IP address. "The parameter to be set is an IP address" means that a value to be set as the parameter is the Internet Protocol, IPv4 or IPv6.

Figure 4A:
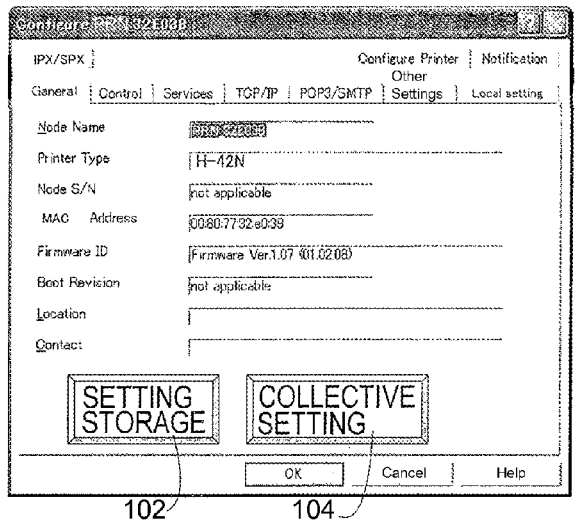
FIGS. 4A through 4C are explanatory views showing setting screens.
Figure 4B:
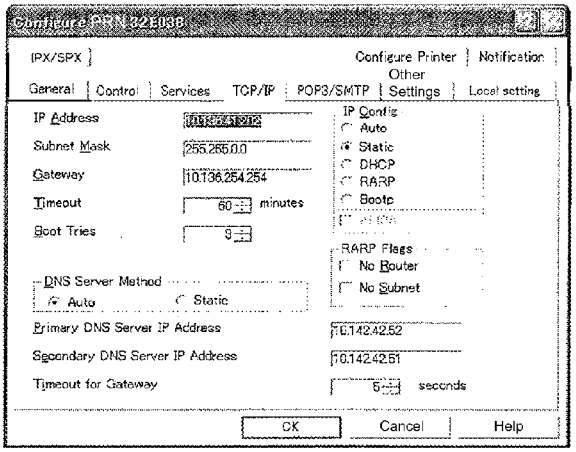
Figure 4C:
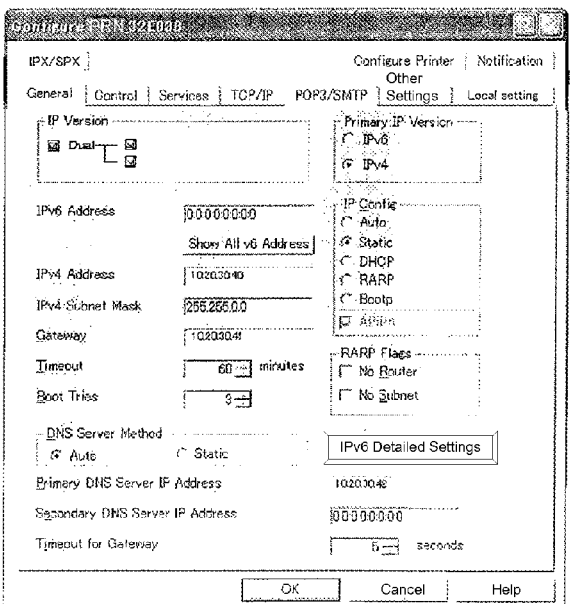

After obtaining the detailed setting information transmitted from the printer 20 which has received the request data, the setting screen is displayed. As shown in FIGS. 4A through 4C. the setting screen includes a plurality of screens to be displayed which can be switched by selecting tabs corresponding to the respective plurality of screens. The respective screens are provided with respective input fields in which parameters corresponding to different functions are entered.

The IP address of the mail server 40 in the detailed setting information is set to enable functions by using the mail server 40, such as the above-mentioned network printing function and Scan_to_E-mail function. The printer 20 is configured to perform the network printing function through the mail server 40.

The setting screen includes, for example, a screen which is displayed when the processing in s108 is first performed after the present setting storage process is started, and which can be switched from the remaining screens by selecting a "General" tab, as shown in FIG. 4A. The screen indicates specific information of a device to be managed. The "specific information" includes the device name (Node Name) obtained by the processing in s102 and a MAC address assigned to the network I/F 26 of the device to be managed. In the screen, a setting storage button 102 for forming a data table containing the detailed setting information of the base printer and a collective setting button 104 for setting the same detailed setting information as the base printer in the other printers 20 are provided.

FIG. 4B shows another screen which is displayed by selecting a "TCP/IP" tab, and in which parameters necessary to perform data communications through the network are indicated. Specifically, the parameters include an IP address assigned to a device, an IP address of the gateway 30 (so-called default gateway) and an IP address of the DNS server 50.

FIG. 4C shows a further screen which is displayed by selecting a "POP3/SMTP" tab, and in which parameters necessary to perform transmission/reception of electronic mail through the network, such as an SMTP server and a POP server, are indicated.

Since the screens shown in FIGS. 4B and 4C are not very important for understanding the present invention, the following description will be based only on the screen shown in FIG. 4A

After the setting screen is displayed, the user may perform an operation to select the setting storage button 102 or the collective setting button 104, or an operation to terminate the present setting storage process (a termination operation).

When an operation to select the setting storage button 102 is performed by the user after the setting screen is displayed in s108 (s110: YES), the IP mode of the base printer is checked based on the detailed setting information collected in s108.

If it is determined that the IP mode is IPv4 (s112:YES), a data table, in which the detailed setting information of the base printer is entered by a later-described IPv4 setting storage process, is created (s114). If it is determined that the IP mode is IPv6 (s112: NO, s116: YES), a data table, in which the detailed setting information of the base printer is entered by a later-described IPv6 setting storage process, is created (s118). If it is determined that the IP mode is Dual (s116: NO, s120: YES), a data table, in which the detailed setting information of the base printer is entered by a later-described Dual setting storage process, is created (s118). Then, the present process returns to s106. If it is determined that the IP mode of the base printer is none of the above (s120: NO), the present process returns to s106.

Figure 5A:
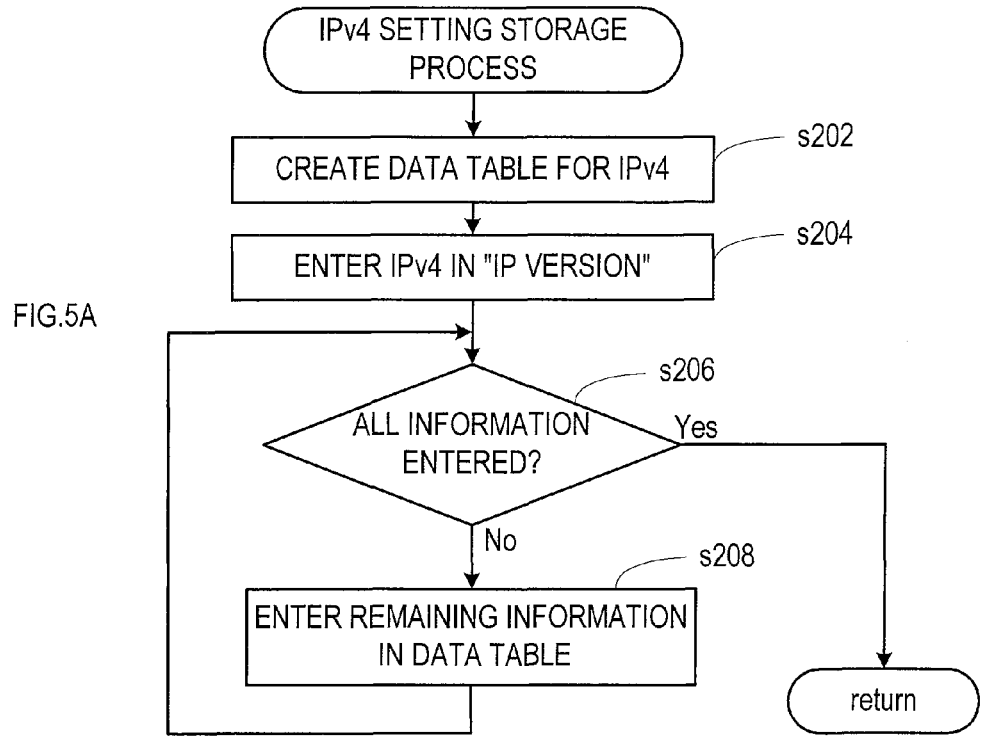
FIG. 5A is a flowchart showing a procedure of an IPv4 setting storage process.

The IPv4 setting storage process will now be described with reference to FIG. 5A. First, a data table for IPv4 is created without any information entered (s202). Then, IPv4, which is information indicated as the IP mode included in the detailed setting information collected in s108, is entered in an item "IP version" in the data table (s204).

Subsequently, it is determined whether or not all the information collected in s108 has been entered in the data table (s206). If it is determined that all the information has not entered in the data table (s206: NO), the remaining information is sequentially entered in the data table (s208). When it is determined that all the information has been entered (s206: YES), the present process returns to s106 shown in FIG. 2A.

When the information is entered in s208, each piece of information is entered with a corresponding value shown in the IP address item ("1" means "YES", and otherwise "NO").

Thus, creation of the data table is completed as shown in FIG. 6A. A setting target IP mode (one of IPv4, IPv6 and Dual), indicating that the information is set according to one of or both of IPv4 and IPv6, is associated with each item in the data table. Only when information with a value of "1 (YES)" in the IP address item is entered, the setting target IP mode corresponding to the information is changed to IPv4 from Dual in an initial state.

Figure 5B:
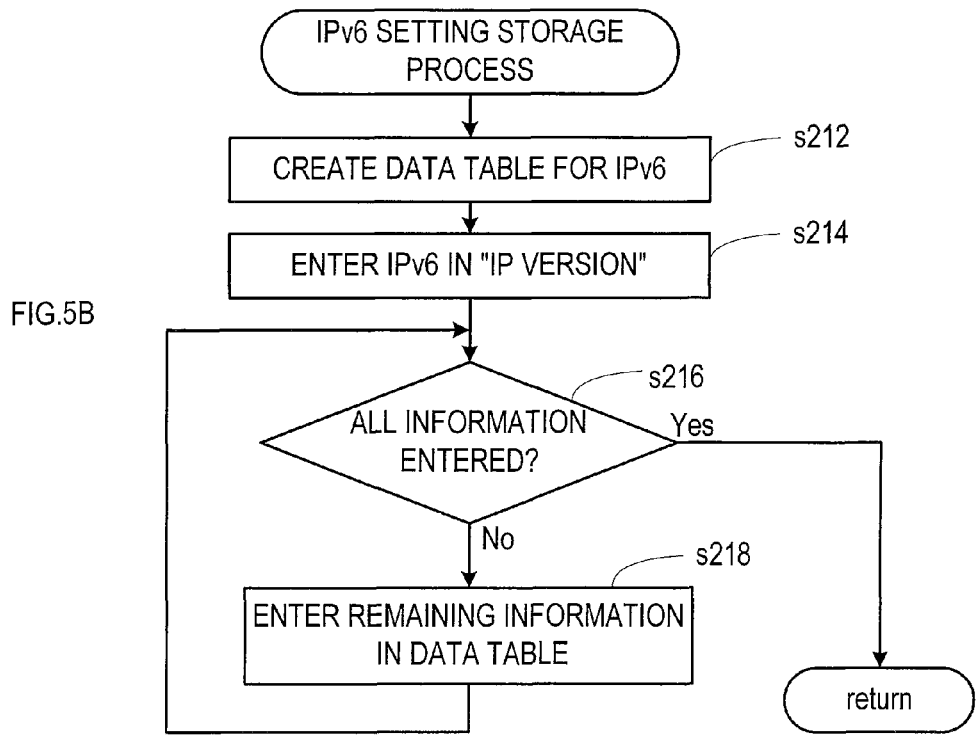
FIG. 5B is a flowchart showing a procedure of an IPv6 setting storage process.

The IPv6 setting storage process will now be described with reference to FIG. 5B. First, a data table for IPv6 is created without any information entered (s212). Then, IPv6, which is information indicated as the IP mode included in the detailed setting information collected in s108, is entered in an item "IP version" in the data table (s214).

Subsequently, it is determined whether or not all the information collected in s108 has been entered in the data table (s216). If it is determined that all the information has not been entered in the data table (s216: NO), the remaining information is sequentially entered in the data table (s218). When it is determined that all the information has been entered (s216: YES), the present process returns to s106 shown in FIG. 2A.

When the information is entered in s218, each piece of information is entered with a corresponding value shown in the IP address item in the same manner as in s208.

Thus, creation of the data table is completed as shown in FIG. 6B. In the data table, a setting target IP mode is associated with each item in the same manner as in the IPv4 setting storage process. Only when information with a value of "1" in the IP address item is entered, the setting target IP mode corresponding to the information is changed from Dual in an initial state to IPv6.

Figure 7:
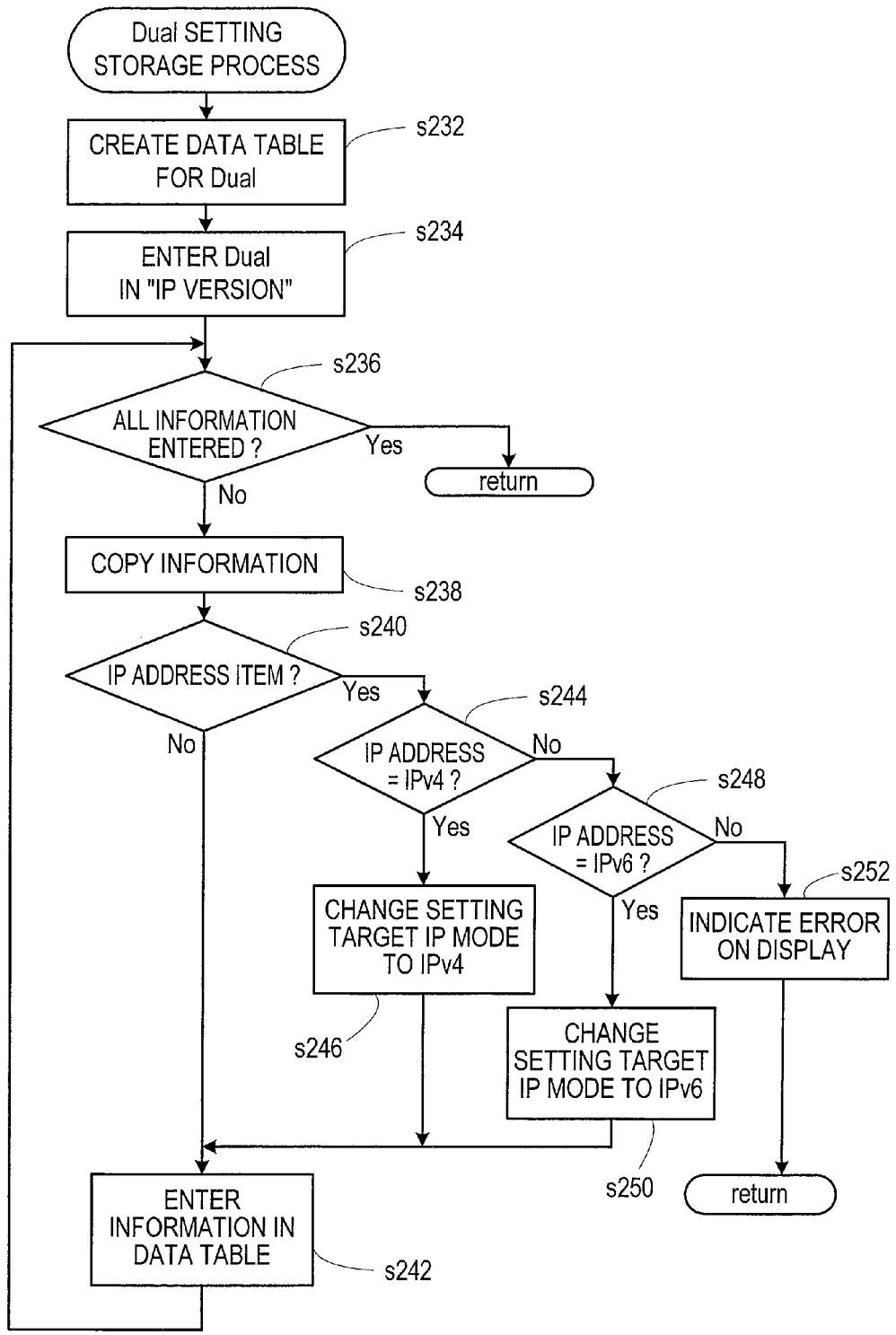
FIG. 7 is a flowchart showing a procedure of a Dual setting storage process.

The Dual setting storage process will now be described with reference to FIG. 7. First, a data table for Dual is created without any information entered (s232). Then, Dual, which is information indicated as the IP mode included in the detailed setting information collected in s108, is entered in an item "IP version" in the data table (s234).

Subsequently, it is determined whether or not all the information collected in s108 has been entered in the data table (s236). If it is determined that all the information has not been entered in the data table (s236: NO), processings from below-described s238 to s252 are repeated until entry of all the information in the data table has been completed. When it is determined that all the information has been entered (s236: YES), the present process returns to s106 shown in FIG. 2A.

Specifically, if it is determined that all the information has not been entered in the data table (s236: NO), a piece of information which has not been entered is copied (a238), and an IP address item corresponding to the piece of information is checked as to whether or not the IP address item is "1".

When it is determined that the IIP address item is not "1", that is, the piece of information does not indicate an IP address (s240: NO), the piece of information is entered in the data table (s242). In the same manner as described above, a setting target IP mode corresponding to the piece of information, which is Dual in an initial state, is not changed unless the piece of information indicates an IP address.

On the other hand, when it is determined that the IP address item is "1", that is, the piece of information indicates an IP address (s240: YES), it is determined whether or not the piece of information is a character string in IPv4 format (s244).

If it is determined that the piece of information is a character string in IPv4 format (s244: YES), a setting target IP mode corresponding to the piece of information is changed to IPv4 (s246). Then, the present process proceeds to s242 and the piece of information is entered in the data table.

If it is determined that the piece of information is not a character string in IPv4 format (s244: NO), it is next determined whether or not the piece of information is a character string in IPv6 format (s248).

If it is determined that that the piece of information is not a character string in IPv6 format (s248:YES), a setting target IP mode corresponding to the piece of information is changed to IPv6 (s250). Then, the present process proceeds to s242 and the piece of information is entered in the data table.

In s244 and s248, the character string is checked by calculating POSIX standard functions "ret=inet_pton(af_inet, ipstring, dst)", "ret=inet_pton(af_inet6, ipstring, dst)" in which the character string is set in each variable "ipstring". In each of the functions, a positive value is returned when the value of the variable "ipstring" is a character string indicating an IP address in IPv4 format or in IPv6 format (i.e., a correct character string), white a negative value is returned when the value of the variable "ipstring" is not a character string indicating an IP address in IPv4 format or in IPv6 format. Accordingly, if a positive value is returned by either of the functions, it means that the character string indicates an IP address in IPv4 format or in IPv6 format. If a negative value is returned by both of the functions, it means that the character string does not indicate an IP address in IPv4 format or in IPv6 format. Then, the present process proceeds to s252.

As described above, when it is determined that the character string is not in either of IPv4 format or IPv6 format (s248: NO), the fact is notified to the user by an error indication on the display 17 (s252). Then, the present process proceeds to s106 in FIG. 2A.

Returning to FIG. 2A, when an operation to select the collective setting button 104 is performed after the setting screen is displayed in s108 (s110: NO, s132: YES), a collective setting screen is displayed on the display 17 (s134).

Figure 8:
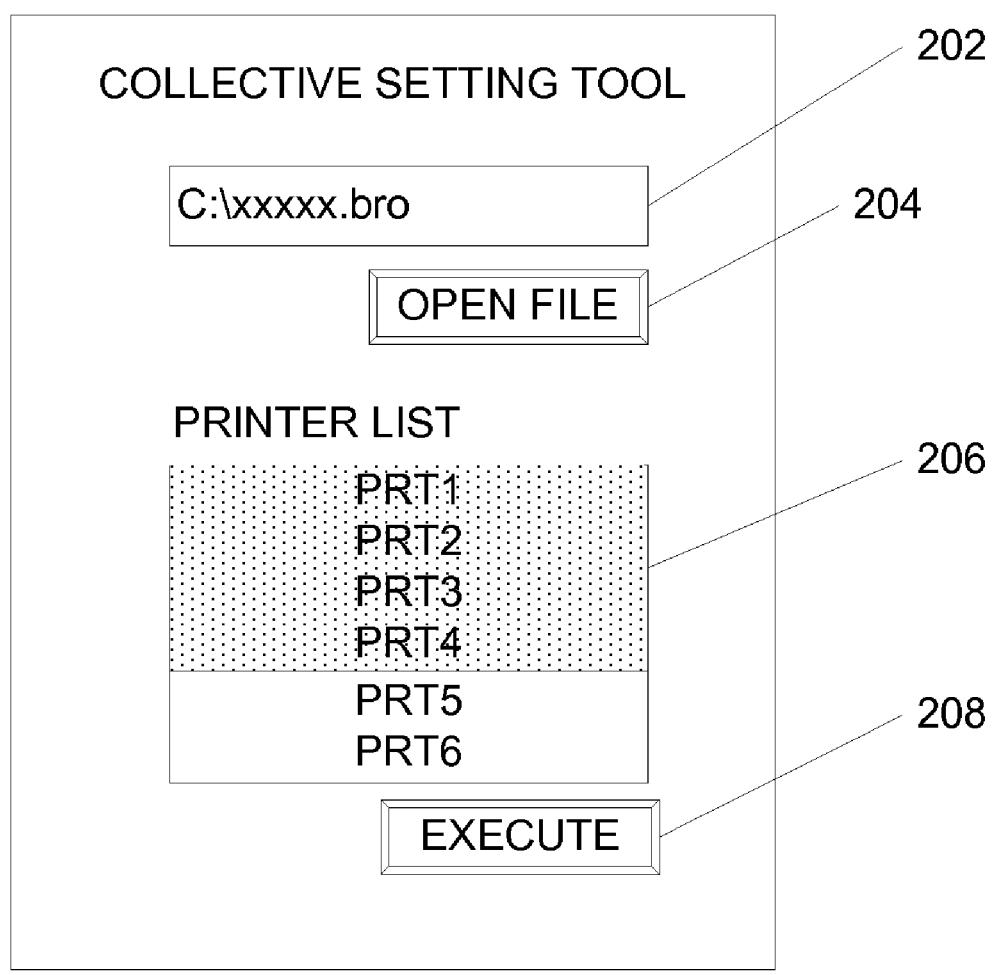
FIG. 8 is an explanatory view showing a collective setting screen.

Specifically, the printers 20 on the network are searched for in the same manner as in s102, and the collective setting screen showing a list of detected printers 20 is displayed on the display 17. As shown in FIG. 8, the collective setting screen is provided with a printer list 206 showing the detected printers 20, an "open file" button 204, a file display field 202 and an execute button 208. The "open file" button 204 is used to specify detailed setting information of the base printer to be used for setting parameters in another printer 20, by specifying a storage area of the data table. The file display field 202 displays a file name of the specified data table. The execute button 208 is used for executing parameter setting in the another printer 20.

Once the collective setting screen is displayed as above, the user may perform an operation to specify at least one of the printers 20 in the list, or an operation to select one of the buttons by means of the input portion 18.

When an operation to select the "open file" button 204 is performed by the user on the collective setting screen (s136: NO, s138: YES), selection of a data table is performed by the user (s140), and the present process returns to s136. The selection in s140 is performed by the user specifying a storage area in which the data table is stored. When specified, the storage area is indicated in the file display field 202 in the collective setting screen.

When an operation to specify a printer 20 in the printer list 206 is performed by the user on the collective setting screen (s136: NO, s138: NO), the specified printer 20 is brought into a selected state (s142). In this case, the selected state of the specified printer 20 is indicated by changing the background color of the specified printer 20 (see a shaded area in FIG. 8). Then, the present process returns to s136.

When an operation to select the execute button 208 is performed on the collective setting screen (s136: YES), it is checked whether or not a data table is selected, i.e., whether or not an appropriate storage area is indicated in the file display field. If it is determined that a data table is not selected (s144: No), a request to select a data table is indicated (s146), and then the present process returns to s136. In s144, it is determined that a data table is selected when a file name of a data table is inputted in the file display field 202.

If it is determined in s144 that a data table is selected (s144: YES), it is checked in s148 whether or not at least one printer 20 in which parameter setting is to be performed is selected. If it is determined that at least one printer 20 is not selected (s148: No), a request to select at least one printer 20 is indicated (s160), and then the present process returns to s136. In s148, it is determined that at least one printer is selected when at least one printer 20 in the printer list 206 is in the selected state.

If it is determined in s148 that at least one printer 20 is selected (s148: YES), it is next checked in s152 whether or not reflection of a data table (which is stored in the storage area inputted in the file display field 202) has been completed with respect to each of the at least one printer 20 that is currently selected. If it is determined that reflection of the data table has not been completed (s152: NO), the following processings from s154 to s158 are repeated. When it is determined that reflection of the data table has been completed (s152: YES), the present process proceeds to s160.

Specifically, if it is determined in s152 that reflection of the data table has not been completed (s152: NO), a connection with a printer, with respect to which reflection of the data table has not been completed (a remaining printer), is established (s154). Then, a data table reflection process described later in detail is performed (s156).

Subsequently, it is checked in s158 whether or not an error has occurred. If it is determined that an error has not occurred (s158: NO), the present process returns to s152. If it is determined that an error has occurred (s168: YES), the present process proceeds to s160 instead of returning to s152.

After repeating the processings from s152 to s158, the collective setting screen displayed in s134 is cleared (s160), and the present process returns to s110.

When it is determined that a termination operation is performed by the user after the setting screen is displayed in s108 (s132: NO, s162; YES), the list screen displayed in s104 and the setting screen displayed in s108 are cleared (s164). Thus, the present setting storage process is terminated.

If it is determined that an operation performed by the user after the setting screen is displayed in s108 is not any of the above described operations (s162: NO), the present process returns to s110.

(ii) Data Table Reflection Process

A procedure of the data table reflection process in s156 in FIG. 2B will be described hereinafter with reference to FIG. 9.

First, an IP mode of the printer 20, with respect to which a connection is established in s154 in FIG. 2B (hereinafter referred to as the "setting target printer"), is confirmed (s302). Specifically, inquiry data to inquire the IP mode of the setting target printer is transmitted to the setting target printer. As described later, notification data to notify the IP mode of the setting target printer is transmitted from the setting target printer which has received the inquiry data. Then, the IP mode indicated by the notification data is confirmed as the IP mode of the setting target printer.

Once the IP mode of the setting target printer is confirmed, it is checked whether or not the IP mode is identical with the IP version in the data table created in s112 to s122 (s304). Specifically, it is checked whether or not the value of the item "IP version" in the above described data table is identical with the IP mode confirmed in s302.

If it is determined that the confirmed IP mode is identical with the IP version of the data table (s304: YES), setting command data to command setting of all parameters is transmitted to the setting target printer, so that each of the information except the "IP version" entered in the data table is to be reflected to a setting target printer as each of all the parameters (s306). Then, the present process proceeds to s158 in FIG. 2B. As described later, setting of all the parameters commanded by the setting command data is performed in the setting target printer which has received the setting command data.

If it is determined that the confirmed IP mode is not identical with the IP version of the data table (s304: NO), setting command data to command setting of only information corresponding to the IP mode confirmed in s302, which is included in the information except "IP version" entered in the data table, as a parameter is transmitted to the setting target printer. Then, the present process proceeds to s158 in FIG. 2B.

More specifically, when the confirmed IP mode is Dual (s308: YES), the present process proceeds to s306, in which setting command data to command setting of all parameters is transmitted to the setting target printer.

When, the confirmed IP mode is IPv4 (s308: NO, s312: YES), setting command data to command setting parameters is transmitted (s314). In this case, only information with the setting target IP mode being "IPv4" and information with the setting target IP mode being "Dual" in the information entered in the data table is reflected to the setting target device as the parameters.

When the confirmed IP mode is IPv6 (s312: NO, s316: YES), setting command data to command setting parameters is transmitted (s318). In this case, only information with the setting target IP mode being "IPv6" and information with the setting target IP mode being "Dual" in the information entered in the data table is reflected to the setting target device as the parameters.

When the confirmed IP mode is none of the above (s316: NO), an error processing is performed (S320), and then, the present process proceeds to s158 in FIG. 2B.

(iii) Setting Reflection Process

A procedure of a setting reflection process performed by the printer 20 (i.e., a CPU 21 of the printer 20) will now be described with reference to FIG. 10. The setting reflection process is repeatedly performed by the selective parameter setting program when the printer 20 is started up.

The present process remains in a waiting state until data is received through the network (s402: NO). When data is received through the network (s402: YES), it is checked in s404 whether or not the data is inquiry data transmitted from the PC 10 in s302 in FIG. 9. If it is determined that the data is inquiry data (s404: YES), notification data to notify the IP mode of the printer 20 is returned (s406), and then, the present process returns to s402. The notification data is to be received by the PC 10 in s302 in FIG. 9.

Figure 9:
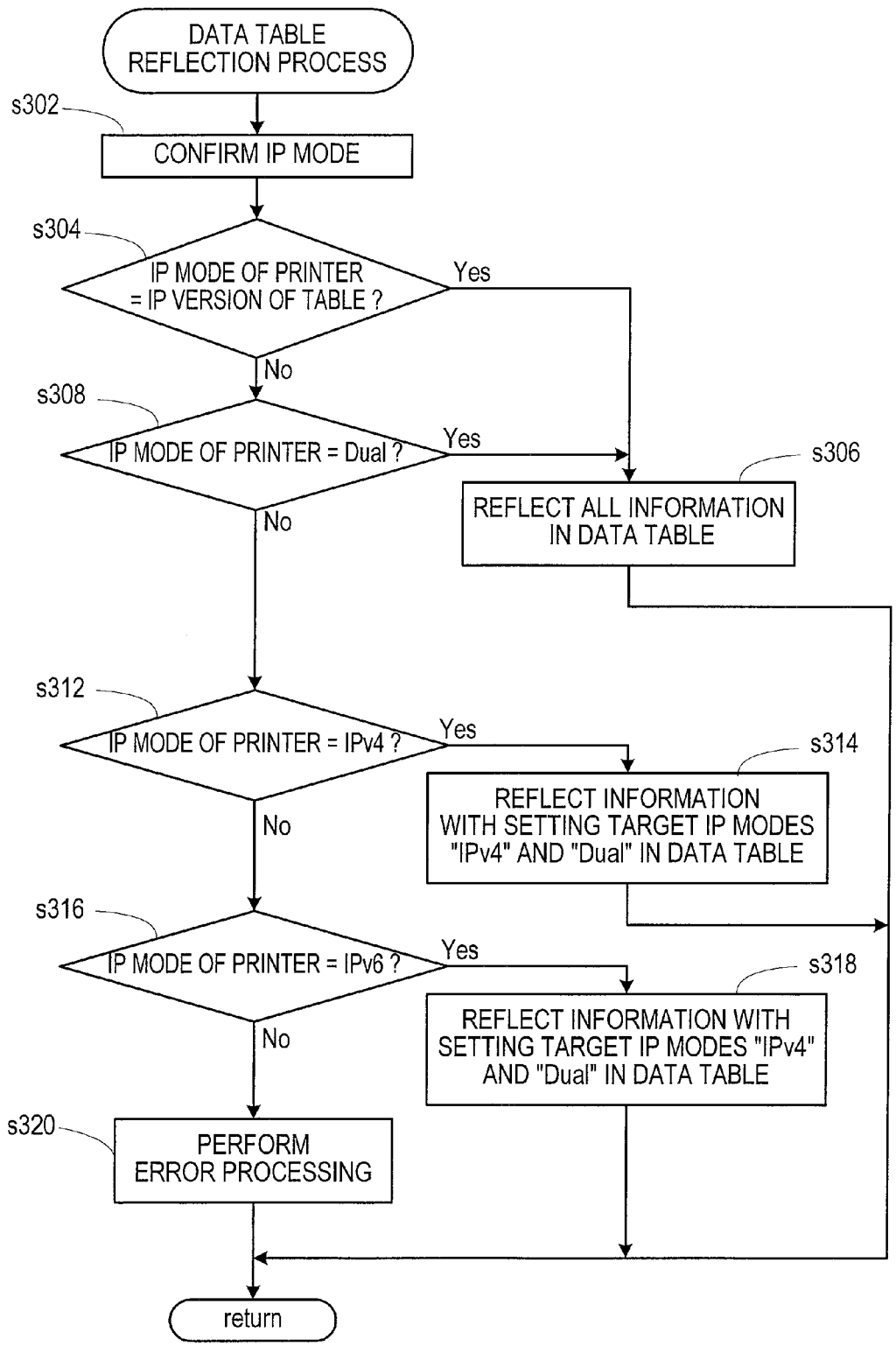
FIG. 9 is a flowchart showing a procedure of a data table reflection process.

If the data received through the network is setting command data transmitted from the PC 10 by the processing in s306, s314 or s318 in FIG. 9 (s408: YES), parameters commanded to be set by the setting command data are reflected to the setting of the printer 20, i.e., the setting is changed (s410). Then, the present process returns to s402.

If the data received through the network is none of the above described data (s408: NO), a processing corresponding to the data (i.e., another processing) is performed (s412), and then, the present process returns to s402. An example of "another processing" is a processing to return appropriate data in response to request data transmitted from the PC 10 by the processing in s102 or s108 in FIG. 2A.

(iii) Network Printing Process

A procedure of network printing process performed by a printer 20 having the above described network printing function will be described hereinafter with reference to FIG. 11.

The network printing process is repeatedly performed after the printer 20 having the network printing function is started up.

The present process remains in a waiting state until a cycle of polling of a POP server has ended (s502: NO). In the present embodiment, the printer 20 is configured to access the POP server (a mail server 40 in the present embodiment) in a specified cycle, in order to occasionally check whether or not electronic mail to the printer 20 has arrived. The end of the cycle (a polling cycle) is waited for in s502.

When it is determined that the polling cycle has ended (s502: YES), it is checked in the printer 20 whether or not an IP address of the POP server is entered with a character string in a format corresponding to the IP mode (IPv4 or IPv6) of the printer 20 (s504).

If it is determined that an IP address of the POP server is not entered (s504: NO), an IP address of the POP server is obtained from a DNS server 50 based on a POP server name which the printer 20 obtains by using a not-shown POP server name obtaining mechanism (s506). Then, the present process proceeds to s508.

If it is determined that an IP address of the POP server is entered (s504: YES), the present process proceeds to s508 instead of s506.

Subsequently, it is checked whether or not the POP server specified by the entered IP address or the IP address obtained in s506 belongs to the same network as the printer 20 (s508).

If it is determined that the POP server belongs to the same network as the printer 20 (s508: YES), the printer 20 directly accesses the POP server (s510). If it is determined that the POP server does not belong to the same network as the printer 20 (s508: NO), the printer 20 accesses the POP server through the gateway 30 (s512).

After the access to the POP server, the present process remains in a waiting state until a connection with the POP server is established by the time a predetermined time-out period has elapsed (s514: NO, s516: NO). When it is determined that the predetermined time-out period has elapsed (s516: YES), the present process returns to s502. If it is determined that a connection with the POP server is established before the time-out period has elapsed (s514: YES), it is checked whether or not e-mail to the printer 20 is received by the POP server (s518).

If it is determined that e-mail to the printer 20 is not received by the POP server (s518: NO), the present process returns to s502. If it is determined that e-mail to the printer 20 is received by the POP server (s518: YES), the printer 20 receives the e-mail from the POP server (s520).

Then, printing data included in the received e-mail is extracted (s522). After printing of an image specified by the printing data is performed by a printing portion 28 (s524), the present process returns to s502.

[Advantages of the First Embodiment]

According to a parameter setting system configured as described above, the PC confirms an IP mode of a setting target printer, i.e., a communication protocol acceptable to the setting target printer, in s302 in FIG. 9, specifies parameters necessary to perform a communication function according to the confirmed communication protocol in s304 and the subsequent steps in FIG. 9, and then setting of the necessary parameters can be performed in the setting target printer. Accordingly, the PC 10 does not provide a command to set parameters for a communication protocol which is not acceptable to the setting target printer, i.e., unnecessary parameters. Thus, setting of unnecessary parameters in the setting target printer can be prevented.

In s112 to s122 in FIG. 2A, a data table, in which parameters obtained from the base printer selected by the user in s106 in FIG. 2A are entered, can be created. Each of the information entered in the created data table may be set as the parameters in the setting target printer in s306, s310, s314 and s318 in FIG. 9.

Especially in the above embodiment, parameters actually set in the base printer, i.e., the parameters actually enabling a communication function, are entered in the data table. Accordingly, a communication function can surely be achieved in the setting target printer in which the same parameters are set.

The base printer, from which information to be entered in the data table in s112 to s122 in FIG. 2A is obtained, is the printer 20 selected by the user from a list displayed in s104. In other words, the user may select the printer 20 from which parameters are obtained at the user's discretion.

The setting target printer, in which parameters are set in s302 and the subsequent steps in FIG. 9, is the printer 20 selected by the user in s142. In other words, the user may select the setting target printer at the user's discretion.

Setting of parameters in the setting target printer in s302 and the subsequent steps in FIG. 9 is performed when the setting screen indicating the setting information of the base printer is displayed and the collective setting button 104 on the setting screen is selected. This means that the user may first confirm information obtained in s108 in FIG. 2A on the setting screen and then decide at the user's discretion whether or not to perform setting of the information in the setting target printer. If information unintended by the user is obtained, the user may again select a printer 20, in which intended information is set as parameters, as a base printer.

[Second Embodiment]

Differences between the first embodiment and the second embodiment are only part of the procedures of the setting storage process and the setting reflection process.

Therefore, only the differences will be described in detail hereinafter.

(i) Setting Storage Process

Figure 12:
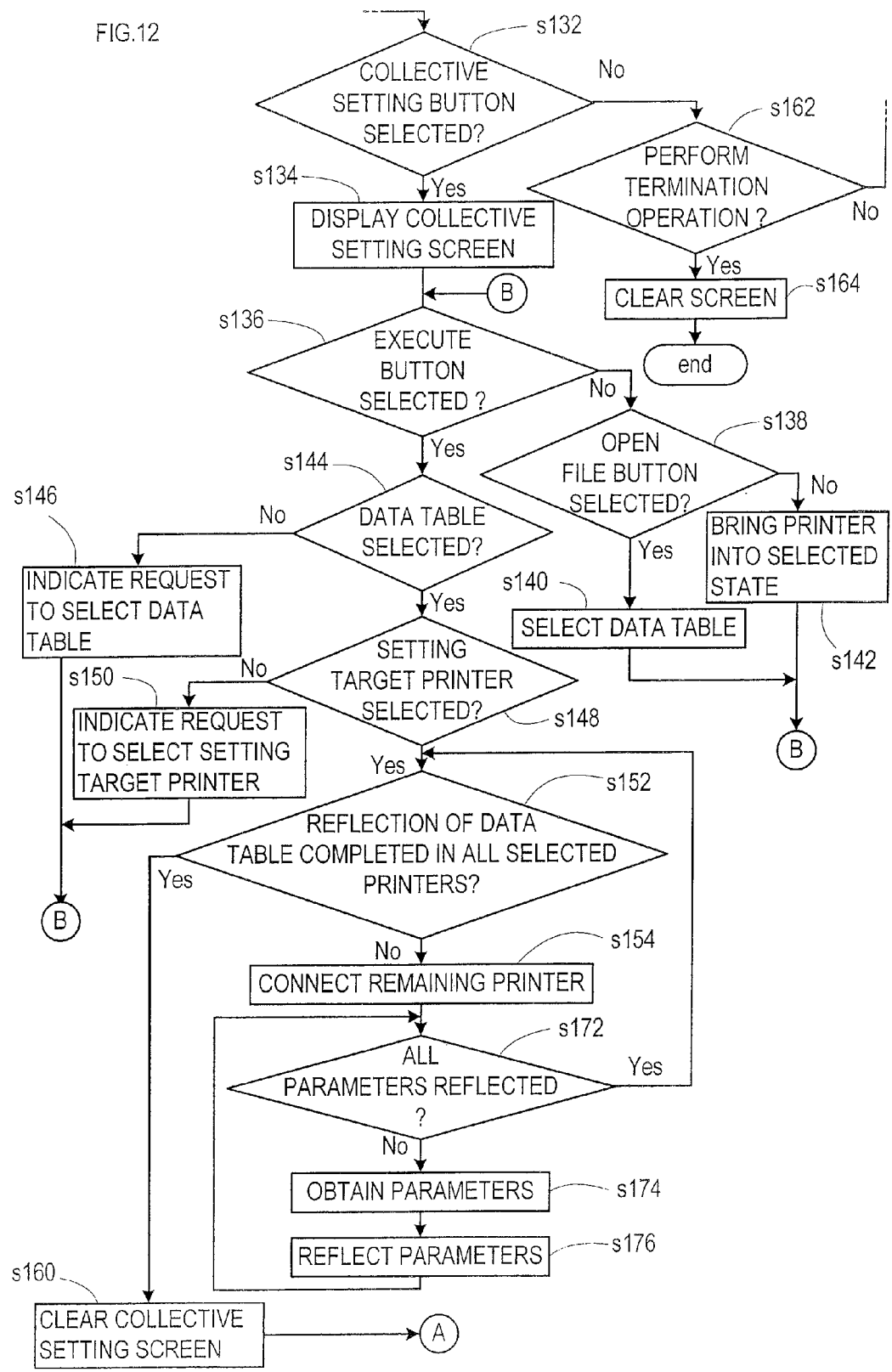
FIG. 12 is a flowchart showing a procedure of a setting storage process in a second embodiment.

In the setting storage process of the present embodiment, it is checked in s172 subsequent to s154 in FIG. 2B whether or not all information except the "IP version" entered in the data table has been reflected to the setting target device, as shown in FIG. 12. If it is determined that the reflection of all the information to the setting target device has not been completed (s172: NO), the below-described processings in s174 and s176 are repeatedly performed. If it is determined that the reflection of all the information to the setting target device has been completed (s172: YES), the present process returns to s152.

Specifically, when it is determined that the reflection of all the information to the setting target device has not been completed (s172: NO), information which has not been reflected to the setting target device in all the information entered in the data table is obtained (s174). Then, to reflect the obtained information to the setting target device as a parameter, setting command data to command to set the parameter is transmitted to the setting target device (s176). The setting command data is transmitted such that an IP address item corresponding to the information obtained in s174 can be specified.

(ii) Setting Reflection Process

Figure 10:
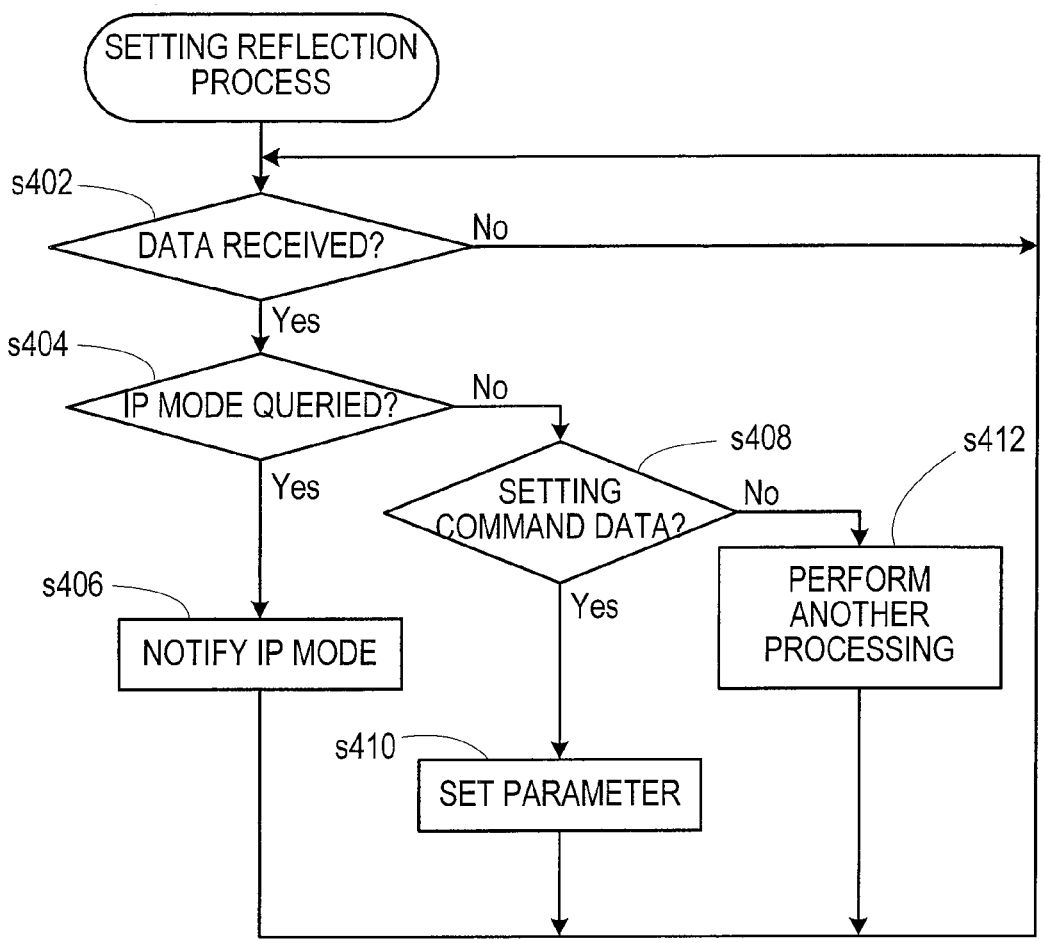
FIG. 10 is a flowchart showing a procedure of a setting reflection process in the first embodiment.
Figure 13:
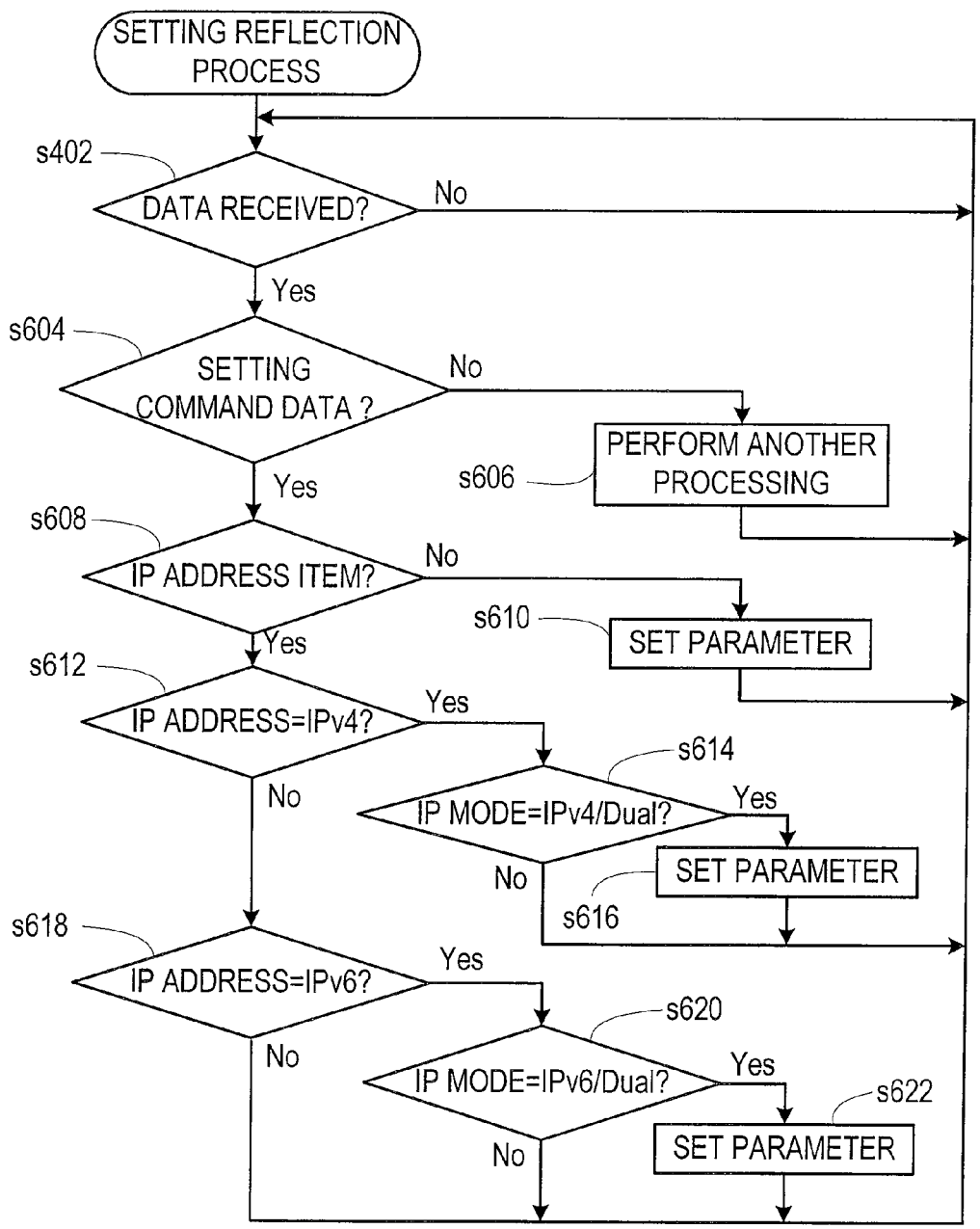
FIG. 13 is a flowchart showing a procedure of a setting reflection process in the second embodiment.

In the setting reflection process of the present embodiment, when it is determined s402 in FIG. 10 that data is received, it is then checked in s604 whether or not the received data is setting command data, as shown in FIG. 13.

Subsequently, it is checked in s608 whether or not the IP address item specified by the setting command data is "1", If it is determined that the IP address item is not "1", that is, the obtained information does not indicate an IP address (s608: NO), the parameter commanded to be set by the setting command data is reflected to the setting of the printer 20 (s610). Specifically, part of the parameters set in the printer 20 is set or updated based on the parameter specified by the setting command data.

If it is determined that the IP address item is "1", that is, the obtained information indicates an IP address (s608: YES), it is then checked whether or not the information is a character string in IPv4 format (s612).

If it is determined that the information is a character string in IPv4 format (s612: YES), it is checked whether or not the IP mode of the printer 20 is set to IPv4 or Dual (s614). If it is determined that the IP mode of the printer 20 is set to IPv4 or Dual (s614: YES), the parameter commanded to be set by the setting command data is reflected to the setting of the printer 20 (s616), and then the present process returns to s402. In other words, when the data received through the network is setting command data to command the setting of an IP address corresponding to IPv4, and if the IP mode of the printer 20 is not set to IPv4 or Dual (s614: NO), the present process returns to s402 without reflecting the parameter to the setting of the printer 20.

If it is determined that the information is a not character string in IPv4 format (s612: NO), it is checked whether or not the information indicated by the setting command data is a character string in IPv6 format. If it is determined that the information is a character string in IPv6 format (s618: YES), it is checked whether or not the IP mode of the printer 20 is set to IPv6 or Dual (s620). If it is determined that the IP mode of the printer 20 is set to IPv6 or Dual (s620: YES), the parameter commanded to be set by the setting command data is reflected to the setting of the printer 20 (s622), and then the present process returns to s402. In other words, when the data received through the network is setting command data to command the setting of an IP address corresponding to IPv6, and if the IP mode of the printer 20 is not set to IPv6 or Dual (s620: NO), the present process returns to s402 without reflecting the parameter to the setting of the printer 20.

[Advantages Of The Second Embodiment]

According to a parameter setting system configured as described above, the following operations and advantages can be achieved in addition to the operations and advantages achieved by the configuration in the first embodiment.

For example, in s604 and the subsequent steps in FIG. 13, the printer 20 can select necessary parameters to perform a communication function according to an IP mode of the printer 20, i.e., a communication protocol acceptable to the printer 20, from among parameters which are commanded to be set by setting command data and then set only the selected parameters.

Accordingly, it is possible to prevent parameters for a communication protocol which is not acceptable to the printer 20, i.e., unnecessary parameters, from being set in the printer 20.

[Modifications]

Although the present invention has been described with reference to the preferred embodiments, it should be understood that the present invention should not be limited to the above embodiments, but may be embodied in various forms without departing from the spirit and scope of the present invention.

For example, while the device that executes the parameter setting program is the PC 10 in the above embodiments, a device other than the PC 10 may be employed. Also, while the device that executes the selective parameter setting program is the printer 20 in the above embodiments, a device other than the printer 20 may executed the program. For example, a scanner, a network camera, a facsimile machine, a network storage, audio visual equipment, or a multifunction machine having a plurality of functions of these machines or equipment may be employed as the device.

While communication protocols having different parameters to perform a communication function are IPv4 and IPv6 in the above embodiments, other communication protocols, including possible communication protocols in the future, may be employed as long as such communication protocols have different parameters.

While an IP mode of a setting target printer is inquired in s302 in FIG. 9 in the above embodiments, an IP mode of a setting target device may be inquired at another timing. For example, since information indicating the IP mode of the setting target printer is obtained in s108 in the above embodiments, the information may be regarded as a result of inquiring the IP mode.

Parameters commanded to be set in the setting target printer are identical with parameters set in the base printer selected in s106 in FIG. 2A in the above embodiments. However, parameters commanded to be set in the setting target printer may be parameters that the user appropriately inputs.

Figure 11:
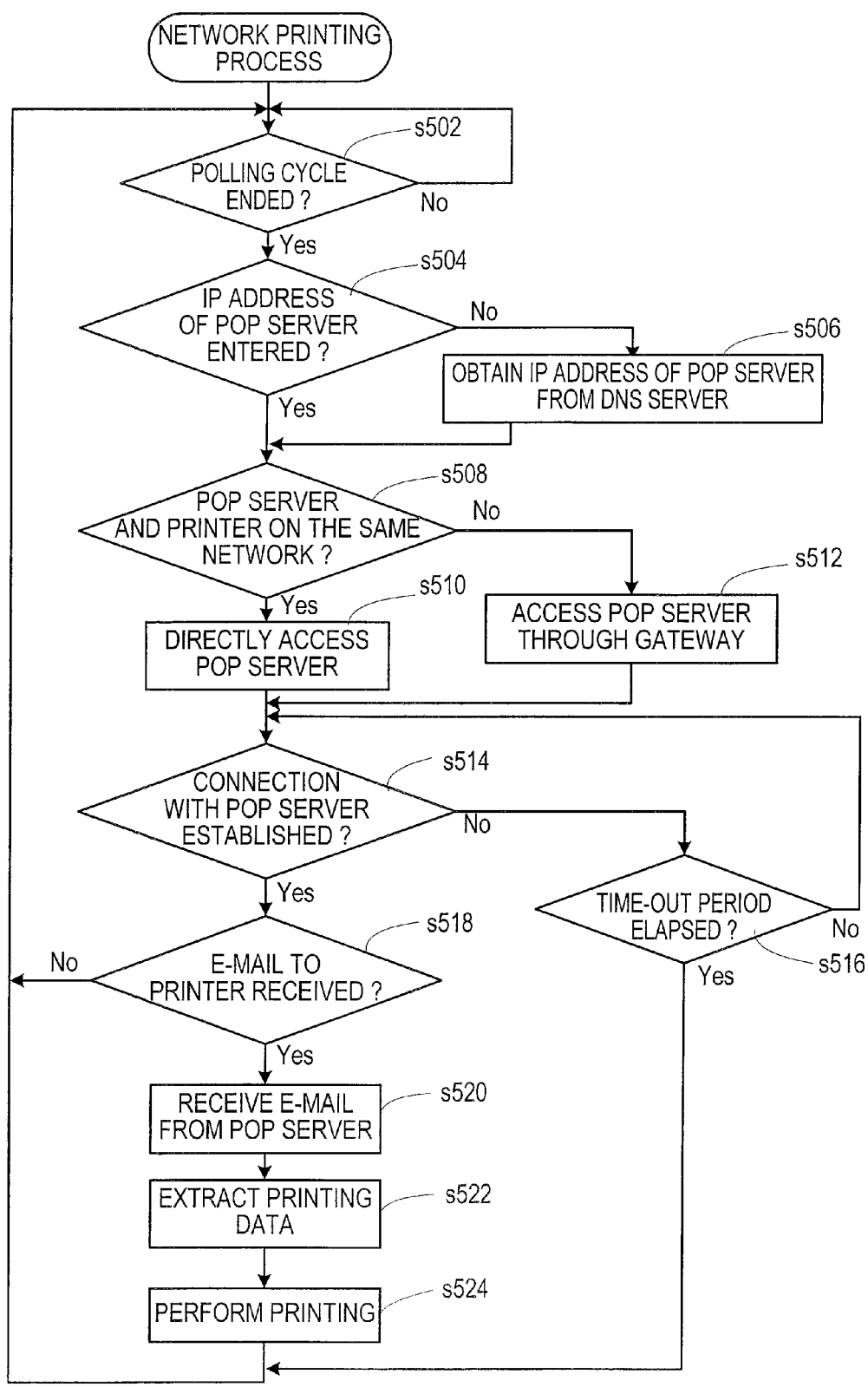
FIG. 11 a flowchart showing a procedure of a network printing process.

While a POP server name obtained by a not-shown POP server name obtaining mechanism is used in s506 in FIG. 11, another configuration may be possible, in which a POP server name is input in the IP address input field of the POP server (POP3 server) and the inputted POP server name is used in s506 in FIG. 11.

What is claimed is:

1. A setting device comprising:
a network interface configured to communicate with a plurality of setting target devices, each of the setting target devices configured to operate in an IPv4 mode and an IPv6 mode, but not both simultaneously;
a storage;
a processor; and
memory storing computer-executable instructions that, when executed by the processor, cause the setting device to perform:
a setting parameter storage control step of storing, in the storage, a setting parameter including an IP address parameter indicating an IP address of a particular network device as a communication destination of the plurality of setting target devices; and
a setting parameter transmission control step of controlling the network interface to transmit the IP address parameter stored in the storage to the plurality of setting target devices,
wherein the setting parameter storage control step includes:
a base device recognition step of recognizing a base device from among the plurality of setting target devices;
an IPv4 parameter storage control step; and
an IPv6 parameter storage control step,
wherein the IPv4 parameter storage control step includes:
determining whether an IPv4 operation mode information, which indicates that the base device operates in an IPv4 mode, is received from the base device via the network interface; and
storing, in the storage, the IP address parameter received from the base device in association with the IPv4 operation mode information when it is determined that the IPv4 operation mode information is received from the base device, and
wherein the IPv6 parameter storage control step includes:
determining whether an IPv6 operation mode information, which indicates that the base device operates in an IPv6 mode, is received from the base device via the network interface; and
storing, in the storage, the IP address parameter received from the base device in association with the IPv6 operation mode information when it is determined that the IPv6 operation mode information is received from the base device, and
wherein the setting parameter transmission control step includes a selective transmission control step of:
controlling the network interface to selectively transmit the IP address parameter, stored in the storage in association with the IPv4 operation mode information, to the setting target devices that operate in the IPv4 mode, but not the IPv6 mode, from among the plurality of setting target devices; and
controlling the network interface to selectively transmit the IP address parameter, stored in the storage in association with the IPv6 operation mode information, to the setting target devices that operate in the IPv6 mode, but not the IPv4 mode, from among the plurality of setting target devices.

2. The setting device according to claim 1, further comprising:
a display unit; and
an input reception unit,
wherein the base device recognition step includes a base device selection object display control step of displaying, on the display unit, base device selection objects which are objects corresponding respectively to the plurality of setting target devices, based on setting target device identification information for identifying each of the plurality of setting target devices, the setting target device identification information being received by the network interface from each of the plurality of setting target devices,
wherein the base device recognition step includes recognizing, as the base device, one of the plurality of setting target devices selected in response to a user's input via the input reception unit after displaying the base device selection objects in the base device selection object display control step,
wherein the setting parameter transmission control step includes a destination device recognition step of recognizing a plurality of destination devices as destinations of setting parameters from among the plurality of setting target devices, the destination device recognition step including:
displaying, on the display unit, destination device selection objects which are objects corresponding respectively to the plurality of setting target devices except the base device, based on the setting target device identification information received by the network interface from the each of the plurality of setting target devices except the base device; and
recognizing, as the destination devices, in a case where the input reception unit receives a user's input for a plurality of objects among the destination device selection objects after displaying the destination device selection objects, setting target devices corresponding to the plurality of objects among the destination device selection objects for which the user's input has been made, and wherein the selective transmission control step is executed on the plurality of destination devices recognized in the destination device recognition step.

3. The setting device according to claim 2, wherein the base device recognition step includes:

recognizing, as the base device, in a case where the input reception unit receives a click input for one of the base device selection objects after displaying the base device selection objects, a setting target device corresponding to the base device selection object for which the click input has been made, and recognizing, as the destination devices, in a case where the input reception unit receives a click input for a plurality of objects among the destination device selection objects after displaying the destination device selection objects, setting target devices corresponding to the plurality of objects among the destination device selection objects for which the click input has been made.

4. The setting device according to claim 2, wherein the selective transmission control step includes an individual destination selective transmission control step of:

selecting one destination device from the plurality of destination devices recognized in the destination device recognition step;

controlling the network interface, in a case where the selected one destination device is a transmitter of the IPv4 operation mode information received by the network interface, to transmit the IP address parameter stored in the storage in association with the IPv4 operation mode information among the IP address parameters stored in the storage without transmitting the IP address parameter stored in the storage in association with the IPv6 operation mode information among the IP address parameters stored in the storage, to the selected one destination device; and controlling the network interface, in a case where the selected one destination device is a transmitter of the IPv6 operation mode information received by the network interface, to transmit the IP address parameter stored in the storage in association with the IPv6 operation mode information among the IP address parameters stored in the storage and without transmitting the IP address parameter stored in the storage in association with the IPv4 operation mode information among the IP address parameters stored in the storage, to the selected one destination device, and wherein the selective transmission control step executes the individual destination selective transmission control step on each of the plurality of destination devices recognized in the destination device recognition step.

5. The setting device according to claim 1, wherein the IPv4 parameter storage control step includes storing, in the storage, a setting file, including the IP address parameter and the operation mode information corresponding to the IP address parameter, as an IPv4 setting file, and wherein the IPv6 parameter storage control step includes storing, in the storage, a setting file, including the IP address parameter and the operation mode information corresponding to the IP address parameter, as an IPv6 setting file which is different from the IPv4 setting file, wherein the setting parameter transmission control step includes:

a setting file selection object display control step of causing the display unit to display setting file selection objects which are objects to select one setting file from a plurality of the setting files stored in the storage; and a file to use recognition step of recognizing, in a case where the setting file is selected using the setting file selection objects after displaying the setting file selection objects in the setting file selection object display control step, the selected setting file as a file to use, and wherein the setting parameter transmission control step executes the selective transmission control step, in a case where the plurality of destination devices are recognized in the destination device recognition step and the file to use is recognized in the file to use recognition step, on the plurality of destination devices recognized in the destination device recognition step using the IP address parameter included in the file to use recognized in the file to use recognition step.

6. The setting device according to claim 1, wherein the base device is a dual mode device configured to communicate according to IPv4 and IPv6, and wherein the setting parameter storage control step includes an IP address determination step of determining whether the IP address parameter is in an IP address format according to IPv4 or in an IP address format according to IPv6.

7. The setting device according to claim 1, wherein one or more of the plurality of setting target devices are dual mode setting target devices configured to communicate according to IPv4 and IPv6, and wherein the selective transmission control step controls the network interface to transmit an IPv4 address parameter stored in the storage in association with the IPv4 operation mode information in the setting parameter storage control step and transmit an IPv6 address parameter stored in the storage in association with the IPv6 operation mode information in the setting parameter storage control step, to the one or more of the plurality setting target devices which are dual mode setting target devices.

8. The setting device according to claim 1, wherein the setting parameter storage control step causes the storage to store, in association with the IP address parameter, a non-address parameter which is a parameter received with the IP address parameter by the network interface and is different from the IP address of the device, wherein the selective transmission control step, based on the operation mode information which is received by the network interface from each of the plurality of setting target devices except the base device and which indicates whether the each of the plurality of setting target devices operates in the IPv4 mode or in the IPv6 mode, controls the network interface to transmit 1) the IP address parameter stored in the storage in association with the IPv4 operation mode information, 2) an IPv4 non-address parameter stored in the storage in association with the IP address parameter, and 3) an IPv6 non-address parameter stored in the storage in association with the IPv6 operation mode information, without transmitting the IPv6 address parameter stored in the storage in association with the IPv6 operation mode information, to the setting target devices that operate in the IPv4 mode, but not the IPv6 mode, from among the plurality of setting target devices, and controls the network interface to transmit 1) the IP address parameter stored in the storage in association with the IPv6 operation mode information, 2) an IPv6 non-address parameter stored in the storage in association with the IP address parameter, and 3) an IPv4 non-address parameter stored in the storage in association with the IPv4 operation mode information, without transmitting the IPv4 address parameter stored in the storage in association with the IPv4 operation mode information, to the setting target devices that operate in the IPv6 mode, but not the IPv4 mode, from among the plurality of setting target devices.

9. A setting target device, comprising:

a network interface;

a storage; and a processor, memory storing computer-executable instructions that, when executed by the processor, cause the setting target device to perform:
- an IP mode control step of 1) controlling the network interface, in a case where the storage stores an IPv4 mode setting information and an IPv4 address parameter indicating an IP address in IPv4 format of a particular network device, to communicate according to IPv4 with the particular network device, and 2) controlling the network interface, in a case where the storage stores an IPv6 mode setting information and an IPv6 address parameter indicating an IP address in IPv6 format of the particular network device, to communicate according to IPv6 with the particular network device;
- an operation mode information transmission control step of 1) controlling the network interface, in a case where the IPv4 mode setting information is stored in the storage, to transmit the IPv4 operation mode information to a setting device, and 2) controlling the network interface, in a case where the IPv6 mode setting information is stored in the storage, to transmit the IPv6 operation mode information to the setting device; and
- an IP address parameter storage control step of 1) storing, in the storage, in a case where the storage stores the IPv4 mode setting information and the network interface receives the IP address parameter transmitted from the setting device after transmitting the IPv4 operation mode information to the setting device, the IP address parameter received by the network interface as the IPv4 address parameter, and 2) storing, in the storage, in a case where the storage stores the IPv6 mode setting information and the network interface receives the IP address parameter transmitted from the setting device after transmitting the IPv6 operation mode information to the setting device, the IP address parameter received by the network interface as the IPv6 address parameter.

10. A parameter setting system, comprising:

a setting device including a first network interface, a first storage, a first processor, and a first memory; and a plurality of setting target devices, each of the setting target devices including a second network interface, a second storage, a second processor, and a second memory, wherein each second memory stores computer-executable instructions that, when executed by the corresponding second processor, cause each of the setting target devices to execute an IP mode control step of 1) controlling the second network interface, in a case where the second storage stores an IPv4 mode setting information and an IPv4 address parameter indicating an IP address in IPv4 format of a particular network device, to communicate according to IPv4 with the particular network device, and 2) controlling the second network interface, in a case where the second storage stores an IPv6 mode setting information and an IPv6 address parameter indicating an IP address in IPv6 format of the particular network device, to communicate according to IPv6 with the particular network device, and wherein the first memory stores computer-executable instructions that, when executed by the first processor, cause the setting device to execute:
- a setting parameter storage control step of storing, in the first storage, a setting parameter including an IP address parameter indicating an IP address of the particular network device; and
- a setting parameter transmission control step of controlling the first network interface to transmit the IP address parameter stored in the first storage to the plurality of setting target devices, wherein the setting parameter storage control step includes:
- a base device recognition step of recognizing a base device from among the plurality of setting target devices;
- an IPv4 parameter storage control step; and
- an IPv6 parameter storage control step, wherein the IPv4 parameter storage control step includes:
- determining whether an IPv4 operation mode information, which indicates that the base device operates in an IPv4 mode, is received from the base device via the first network interface; and
- storing, in the first storage, the IP address parameter received from the base device in association with the IPv4 operation mode information when it is determined that the IPv4 operation mode information is received from the base device, and wherein the IPv6 parameter storage control step includes:
- determining whether an IPv6 operation mode information, which indicates that the base device operates in an IPv6 mode, is received from the base device via the first network interface; and
- storing, in the first storage, the IP address parameter received from the base device in association with the IPv6 operation mode information when it is determined that the IPv6 operation mode information is received from the base device, and wherein the setting parameter transmission control step includes a selective transmission control step of:
- controlling the first network interface to selectively transmit the IP address parameter, stored in the first storage in association with the IPv4 operation mode information, to the setting target devices that operate in the IPv4 mode, but not the IPv6 mode, from among the plurality of setting target devices; and
- controlling the first network interface to selectively transmit the IP address parameter, stored in the first storage in association with the IPv6 operation mode information, to the setting target devices that operate in the IPv6 mode, but not the IPv4 mode, from among the plurality of setting target devices, wherein each second memory stores additional computer-executable instructions that, when executed by the corresponding second processor, cause each of the setting target devices to execute:

an operation mode information transmission control step of 1) controlling the second network interface, in a case where the IPv4 mode setting information is stored in the second storage, to transmit the IPv4 operation mode information to the setting device, and 2) controlling the second network interface, in a case where the IPv6 mode setting information is stored in the second storage, to transmit the IPv6 operation mode information to the setting device; and an IP address parameter storage control step of 1) storing, in the second storage, in a case where the second storage stores the IPv4 mode setting information and the second network interface receives the IP address parameter transmitted from the setting device after transmitting the IPv4 operation mode information to the setting device, the IP address parameter received by the second network interface as the IPv4 address parameter, and 2) storing, in the second storage, in a case where the second storage stores the IPv6 mode setting information and the second network interface receives the IP address parameter transmitted from the setting device after transmitting the IPv6 operation mode information to the setting device, the IP address parameter received by the second network interface as the IPv6 address parameter.

11. A parameter setting method for use in a parameter setting system comprising a setting device including a first network interface and a first storage and a plurality of setting target devices, each of the plurality of setting target devices including a second network interface and a second storage, the parameter setting method comprising:

an IP mode control step of 1) controlling the second network interface, in a case where the second storage stores an IPv4 mode setting information and an IPv4 address parameter indicating an IP address in IPv4 format of a particular network device, to communicate according to IPv4 with the particular network device, and 2) controlling the second network interface, in a case where the second storage stores an IPv6 mode setting information and an IPv6 address parameter indicating an IP address in IPv6 format of the particular network device, to communicate according to IPv6 with the particular network device;

a setting parameter storage control step of storing, in the first storage, a setting parameter including an IP address parameter indicating an IP address of the particular network device; and a setting parameter transmission control step of controlling the first network interface so as to transmit the IP address parameter stored in the first storage in the setting parameter storage control step to the plurality of setting target devices, wherein the setting parameter storage control step includes:
  a base device recognition step of recognizing a base device from among the plurality of setting target devices;
  an IPv4 parameter storage control step; and
  an IPv6 parameter storage control step,
  wherein the IPv4 parameter storage control step includes:
    determining whether an IPv4 operation mode information, which indicates that the base device operates in an IPv4 mode, is received from the base device via the first network interface; and
    storing, in the first storage, the IP address parameter received from the base device in association with the IPv4 operation mode information when it is determined that the IPv4 operation mode information is received from the base device, and
  wherein the IPv6 parameter storage control step includes:
    determining whether an IPv6 operation mode information, which indicates that the base device operates in an IPv6 mode, is received from the base device via the first network interface; and
    storing, in the first storage, the IP address parameter received from the base device in association with the IPv6 operation mode information when it is determined that the IPv6 operation mode information is received from the base device, and
  wherein the setting parameter transmission control step includes a selective transmission control step of:
    controlling the first network interface to selectively transmit the IP address parameter, stored in the first storage in association with the IPv4 operation mode information, to the setting target devices that operate in the IPv4 mode, but not the IPv6 mode, from among the plurality of setting target devices; and
    controlling the first network interface to selectively transmit the IP address parameter, stored in the first storage in association with the IPv6 operation mode information, to the setting target devices that operate in the IPv6 mode, but not the IPv4 mode, from among the plurality of setting target devices, the parameter setting method further comprising:
  an operation mode information transmission control step of 1) controlling the second network interface, in a case where the IPv4 mode setting information is stored in the second storage, to transmit the IPv4 operation mode information to the setting device, and 2) controlling the second network interface, in a case where the IPv6 mode setting information is stored in the second storage, to transmit the IPv6 operation mode information to the setting device; and
  an IP address parameter storage control step of 1) storing, in the second storage, in a case wherein the second storage stores the IPv4 mode setting information and the second network interface receives the IP address parameter transmitted from the setting device after transmitting the IPv4 operation mode information to the setting device, the IP address parameter received by the second network interface as the IPv4 address parameter, and 2) storing, in the second storage, in a case wherein the second storage stores the IPv6 mode setting information and the second network interface receives the IP address parameter transmitted from the setting device after transmitting the IPv6 operation mode information to the setting device, the IP address parameter received by the second network interface as the IPv6 address parameter.

12. A non-transitory computer readable medium storing computer-executable instructions that, when executed by a processor, cause a setting device to perform:

a setting parameter storage control step of storing, in a storage, a setting parameter including an IP address parameter indicating an IP address of a particular network device as a communication destination of a plurality of setting target devices; and a setting parameter transmission control step of controlling a network interface of the setting device to transmit the IP address parameter stored in the storage to the plurality of setting target devices, wherein the setting parameter storage control step includes:

a base device recognition step of recognizing a base device from among the plurality of setting target devices;

an IPv4 parameter storage control step; and an IPv6 parameter storage control step, wherein the IPv4 parameter storage control step includes:

determining whether an IPv4 operation mode information, which indicates that the base device operates in an IPv4 mode, is received from the base device via the network interface; and storing, in the storage, the IP address parameter received from the base device in association with the IPv4 operation mode information when it is determined that the IPv4 operation mode information is received from the base device, and wherein the IPv6 parameter storage control step includes:

determining whether an IPv6 operation mode information, which indicates that the base device operates in an IPv6 mode, is received from the base device via the network interface; and storing, in the storage, the IP address parameter received from the base device in association with the IPv6 operation mode information when it is determined that the IPv6 operation mode information is received from the base device, and wherein the setting parameter transmission control step includes a selective transmission control step of:

controlling the network interface to selectively transmit the IP address parameter, stored in the storage in association with the IPv4 operation mode information, to the setting target devices that operate in the IPv4 mode, but not the IPv6 mode, from among the plurality of setting target devices; and controlling the network interface to selectively transmit the IP address parameter, stored in the storage in association with the IPv6 operation mode information, to the setting target devices that operate in the IPv6 mode, but not the IPv4 mode, from among the plurality of setting target devices.

* * * * *